United States Patent [19]
Fiddes et al.

[11] Patent Number: 5,586,712
[45] Date of Patent: Dec. 24, 1996

[54] APPARATUS FOR JOINING FOILS USED IN SUPERCONDUCTING MAGNETS

[75] Inventors: Neil G. Fiddes, Columbia; Christopher G. King, Florence; Anthony Mantone, Effingham; Frank D. Shaffer, Quimby, all of S.C.

[73] Assignee: General Electric Company, Milwaukee, Wis.

[21] Appl. No.: 369,957

[22] Filed: Jan. 9, 1995

Related U.S. Application Data

[62] Division of Ser. No. 148,303, Nov. 8, 1993.

[51] Int. Cl.⁶ .................................................. B23K 37/04
[52] U.S. Cl. ............................................................ 228/5.7
[58] Field of Search .......................... 228/5.7, 111, 110.1, 228/153, 212, 213, 170, 171, 49.3; 29/599, 870, 872

[56] References Cited

U.S. PATENT DOCUMENTS

| | | | |
|---|---|---|---|
| 3,421,676 | 1/1969 | Jenkins | 228/5.7 |
| 4,765,532 | 8/1988 | Uomoti et al. | 228/5.7 |
| 4,840,303 | 6/1989 | Fujii et al. | 228/5.7 |
| 5,172,846 | 12/1992 | Hayashi et al. | 228/5.7 |

*Primary Examiner*—P. Austin Bradley
*Assistant Examiner*—Jeanne M. Elpel
*Attorney, Agent, or Firm*—Irving M. Freedman; John H. Pilarski

[57] ABSTRACT

Apparatus for forming welded joints on superconducting foils to form long lengths of foil for use in superconducting magnet tapes including fixturing for controlling the accurate positioning of sheared foils and control of the overlap to be welded.

20 Claims, 3 Drawing Sheets

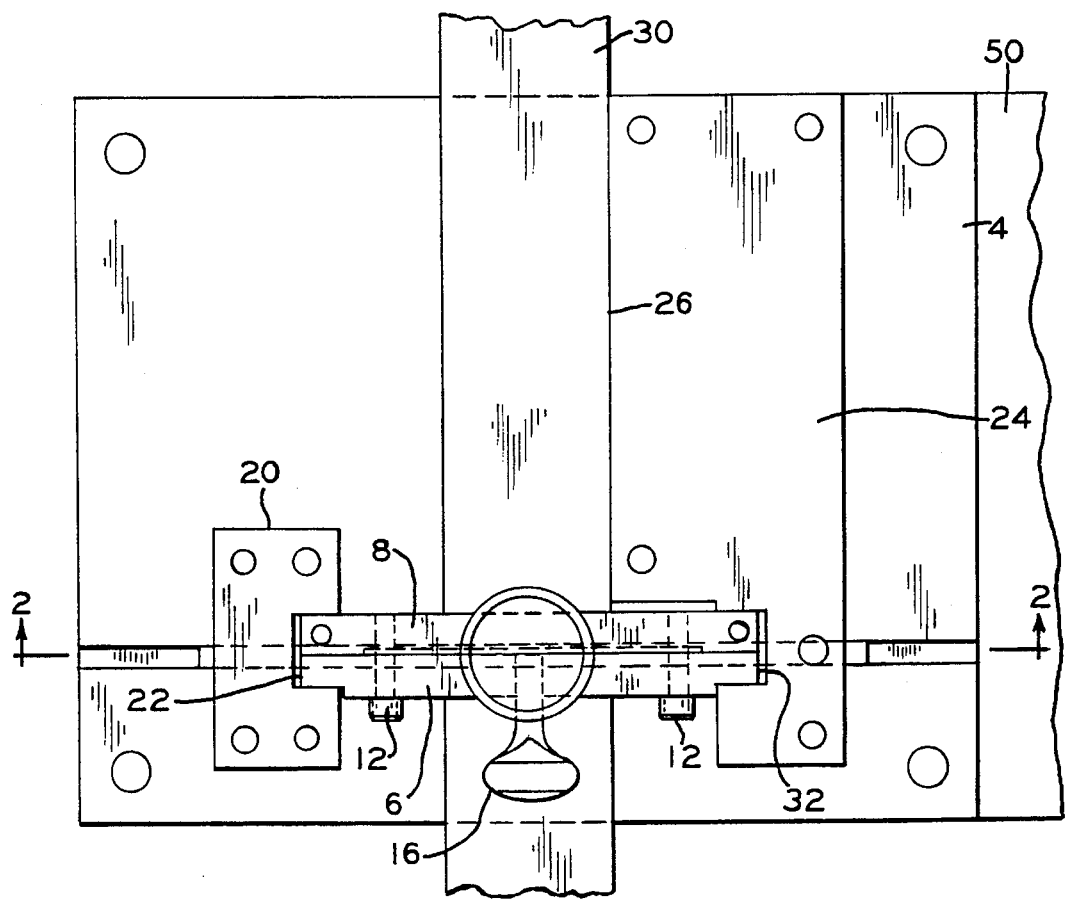
FIG_1
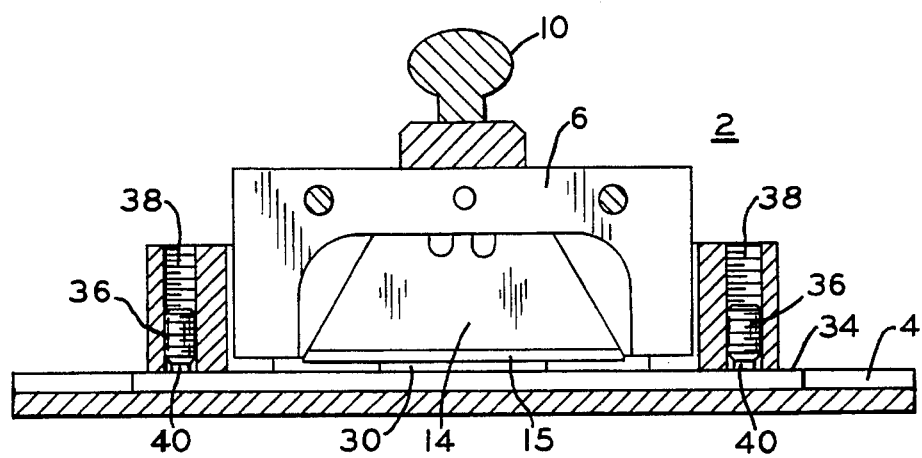
FIG_2

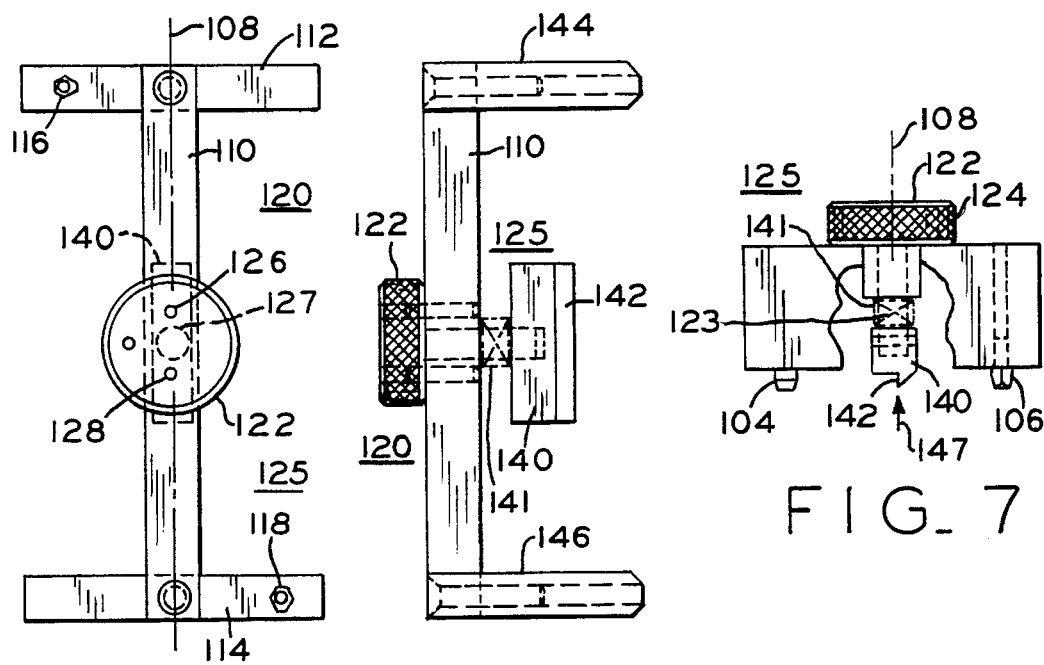
FIG_5  FIG_6  FIG_7
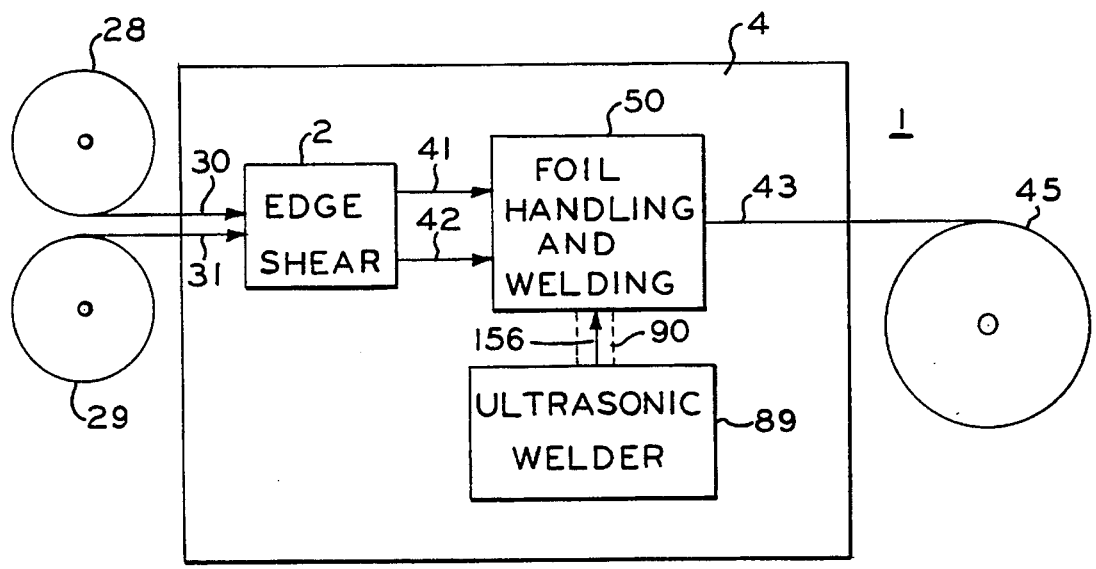
FIG_8

APPARATUS FOR JOINING FOILS USED IN SUPERCONDUCTING MAGNETS

This is a Divisional, of application Ser. No. 148,303 filed Nov. 8, 1993.

BACKGROUND OF INVENTION

This invention relates to an apparatus and method for joining foils used in superconducting magnet tape to provide a superconducting joint.

As is well known, a magnet can be made superconducting by placing it in an extremely cold environment, such as by enclosing it in a cryostat or pressure vessel containing liquid helium or other cryogen. The extreme cold reduces the resistance in the magnetic coils to negligible levels, such that when a power source is initially connected to the coil (for a period, for example, of ten minutes) to introduce a current flow through the coils, the current will continue to flow through the coils due to the negligible coil resistance even after power is removed, thereby maintaining a magnetic field. Superconducting magnets find wide application, for example, in the field of magnetic resonance imaging (hereinafter called "MRI").

Considerable research and development efforts have been directed at eliminating the need for a boiling cryogen, such as liquid helium, and in providing superconducting magnets which maintain the magnetic state and do not "quench," or discontinue superconductivity. However, the differential thermal expansion and contraction between materials in superconducting magnets, which are cycled from ambient temperature to temperatures in the range of absolute zero (−270° C.), and the extremely large magnetic forces provided, and utilized, in a MRI lead to conflicting characteristics required of the materials, used in MRI magnet coils. In addition, the desired superconducting magnet coil material such as $Nb_3Sn$ is often relatively brittle and difficult to handle in winding coils.

However, the manufacture of laminated tape suitable for superconducting use involves the lamination of long lengths of different materials such as niobium tin ($Nb_3Sn$) and copper by applying pressure while the $Nb_3Sn$ and copper foils are fed through a molten solder bath and pinched together. The manufacturing process involves passing the foils and tape through a plurality of manufacturing process stations where the foils and tape are for example cleaned, anodized, unwound from and wound onto spools, passed by idler pulleys, laminated, passed through a solder bath, cut into strips and insulated.

A portion of such a manufacturing process is disclosed in our U.S. patent application, Ser. No. 07/967,316 now U.S. Pat. No. 5,299,728 entitled "Method and Apparatus For Laminating Foils Into Superconducting Tape For Use In A Superconducting Magnet", assigned to the same assignee as the present invention.

A persistent problem encountered in the manufacture of laminated tape suitable for use in superconducting magnet coils is that the lengths of the foils required to form a magnet does not correspond to the lengths of foil obtainable from foil manufacturers. As a result there is frequently unused portions of expensive foil. In addition, the various manufacturing stations and processes frequently result in the loss of end portions of the foil being processed and the ability to add leaders and trailers, or small portions at the ends of the tape being processed is highly desirable in conserving the foils. It is thus important to be able to suitably join foils used in the manufacture of superconducting tapes. However, it is also extremely important that the joint not only be susceptible of being made superconducting but also minimize any heat generated across the joint which will occur during superconducting current flow since any heat generated will result in the boiling and necessary replacement of the helium. Moreover, in passing through various pinch areas and around pulleys during the manufacturing process, the joint must pass freely through various restricted regions without presenting any loose ends which could bend or get caught in restricted regions of the process equipment. Also, the joints must pass without damage through seals in manufacturing stations which are isolated from the surrounding atmosphere, with such seals and their use in superconducting tape manufacture being disclosed in our patent application entitled "Seal Assembly For Superconducting Magnet Tape Ovens", application Ser. No. 07/923,427, now U.S. Pat. No. 5,379,019 and assigned to the same assignee as the present invention.

The length of foil supplied by foil manufacturers is not uniform and depends on the length obtained during their manufacturing process. Foil lengths vary in the range of from 5,000 to 9,000 feet long while up to 60,000 feet of superconducting tape is typically utilized in a superconducting magnet for MRI use. Joining foils with superconducting joint capabilities enables the manufacture of superconducting tapes for superconducting magnets which are longer than the foils supplied by foil manufacturers.

Existing foil welding apparatus and methods have not proven to be entirely satisfactory. Problems with superconducting ability and critical current flow across the weld for MRI applications are overcome by the present invention.

It thus becomes important to provide satisfactory joints for foils suitable for use in superconducting magnet tapes. It is important that a superconducting joint exhibit minimum heat loss during operation, and minimized overlap without loose or separable joints must be provided. Still further, it is important that the weld region not interfere with subsequent manufacturing operations involving embossing the tape and flowing liquid tin over the embossed surfaces as described, for example, in our co-pending patent application, Ser. No. 08/134,456 entitled "Apparatus For Embossing Superconducting Tape For Use In A Superconducting Magnet", assigned to the same assignee as the present invention. Joints formed by the present invention do not inhibit the proper flow of tin in forming $Nb_3Sn$ superconducting tape, particularly if the joints are rolled to reduce the thickness of the overlapped joint.

The ability to process longer lengths of foil formed by superconducting joints through use of the present invention at the start of the process of manufacturing laminated superconducting tapes can greatly reduce process cost through reductions in set up times at each step of the process, and increase the overall yield of the process, which in manufacturing $Nb_3Sn$ tape involves twelve separate serial processes or work stations.

OBJECTS AND SUMMARY OF INVENTION

It is an object of the present invention to provide an improved apparatus and method for joining foils used in superconducting tapes suitable for use in superconducting magnet coils.

It is another object of the present to provide an improved apparatus and method for joining foils used in superconducting tape which is suitable for use with thin foils of material, including brittle material for use in superconducting magnet coils.

It is yet another object of the present invention to provide an improved apparatus and method for joining thin foils which provides a strong superconducting joint with minimized overlap, and with maximum compactness which can withstand a multiple sequential processes used in the manufacturing of superconducting magnet tape such as $Nb_3Sn$ tape.

Still another object of the present invention is to provide an improved apparatus and method for joining foils used in superconducting magnet tape suitable for use in superconducting magnets in order to conserve materials, reduce cost and minimize the time required for the manufacture of the superconducting magnet tape.

A still further object of the present invention is to provide an improved apparatus and method for joining foils used in superconducting magnet tapes which overcomes problems of critical current flow across the joint and of superconducting ability of the tapes.

In accordance with one form of the invention, apparatus is provided for forming superconducting joints for superconducting foils used in the manufacture of superconducting magnet tapes providing square edge shearing, with foil handling and positioning to provide the overlapped foils under a guided welder path.

The square edge shearing includes a base over which the superconducting foils are positioned against a foil edge guide and a blade moveable within slots in a blade support frame which is perpendicular to the base and orthagonally positioned relative to the foil edge guide to enable the blade to be guided down over the foil at right angles to the length of the foil. A renewable insert surface on the base below the blade is provided such that the foil is clamped between the cutting edge of the blade and the surface provide a shear end perpendicular to the length of the foil. The renewable insert has a square cross-section which may be rotated and secured to the base to utilize all four surfaces of the insert.

The foil handling includes two adjacent foil perforated retaining surfaces having vacuum means to selectively retain the sheared ends of the tapes to be joined, with an edge guard for the foils and enabling the positioning of the sheared ends of the foils a preselected amount. The vacuum retains each foil in the overlapped position such that the ultrasonic welding head or horn may be guided over the overlapping portion to form a uniform superconducting joint.

The vacuum means include a perforated surface with a solenoid actuated valve connected to each perforated surface to enable the selective holding of the foil against the perforated surface when the vacuum is applied. A vacuum pump is connected through a parallel connection to a manifold in each of the foil handling or foil retaining portions.

The overlap distance is controlled by a reversible abutting foil guide to provide a stop against which the end of each foil is pushed to properly position each foil. After each foil is properly positioned it is held in position by the vacuum. The reversible foil guide includes a pair of offset pins which mate with cooperating sockets in the base to selectively position the stop in 2 positions, each spaced one half of the amount of the overlap from the axis between the pins to provide the preselected overlap. The ultrasonic welding horn may then be guided precisely over the overlap to provide a complete, compact and uniform ultrasonic weld with squared edges and suitable for passage through the various subsequent manufacturing procedures in the formation of the superconducting tape with a superconducting joint at the location of the weld.

BRIEF DESCRIPTION OF INVENTION

FIG. 1 shows the square edge shearing means of FIG. 8.

FIG. 2 is a cross-sectional view taken along lines 2—2 of FIG. 1.

FIGS. 5–7 show the removable and reversible abutting foil guide of FIGS. 3 and 4 with FIG. 7 being enlarged.

FIG. 8 shows one embodiment of the invention in simplified form.

Figure 3:
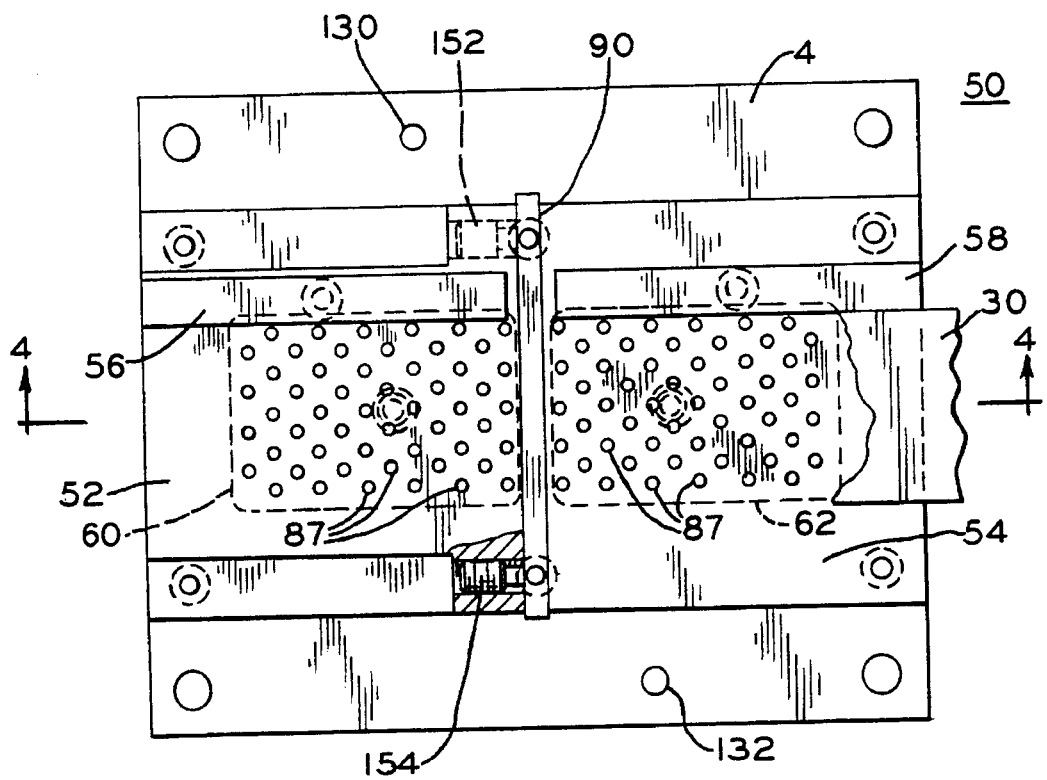
FIG. 3 shows the foil handling and positioning portion of FIG. 8.

Referring first to FIGS. 1, 2 and 8, edge shear 2 of weld fixture or work station 1 includes a pair of U-shaped cutter frames 6 and 8 fastened together by retaining screw 12 and including knob 10 at the top. Sandwiched and secured between frames 6 and 8 is a utility blade such as that sold by the Stanley Company under their designation number 11-911 and which includes a utility blade 14 with a cutting edge 15.

Cutter frame 6, 8 is precisely moveable within cutter guides or vertical slots 22 on cutter guide 20 and vertical slot 32 on foil and cutter guide 24.

Foil edge guide 26 extends perpendicular to blade 15 such that foil 30 which may be a NbZr alloy one inch wide is positioned by the foil edge guide to be exactly perpendicular to blade 14. As shown in FIG. 8, foil 30 may be the foil supply on rotatable spool 28 while foil 31 is the foil on rotatable spool 29 which are joined as described below. Insert 34 is a hardened and ground bar positioned directly under blade 15 such that tape 30 lies across insert 34 directly below the blade. Insert 34 has a square cross section and a pair of orthagonal bores at each end which enables all four surfaces along the length of the insert to be sequentially positioned on a recess in base 4 and secured in place by tightening threaded retaining screw 36 in threaded aperture 38. The reduced diameter end portions 40 of retaining screws 36 cooperate with the orthagonal bores of insert 34 to retain the insert in place with the desired surface exposed to blade 15.

After foil 30 is positioned against foil edge guard 26, blade 15 is moved into contact with the foil by downward pressure on handle 10 providing a firm, sharp, positive shearing surface of edge 15 across foil 30. Foil 30 may then be sheared by pulling upward on the foil against edge 15 in the region opposite retaining thumb screw 16.

Blade 14 can be replaced by removing U-shaped cutter frame 6, 8 from vertical slots 22 and 32 after which the U-shaped cutter frame portion 6 is separated from portion 8 by loosening of retaining screws 12. Blade 14 can then be removed and a replacement blade substituted, after which the cutter frame 6, 8 may be reassembled.

After foil 30 is sheared, the end of foil 31 is sheared and foils 30 and 31 placed on foil handling and welding means 50 which is positioned on base 4.

Figure 4:
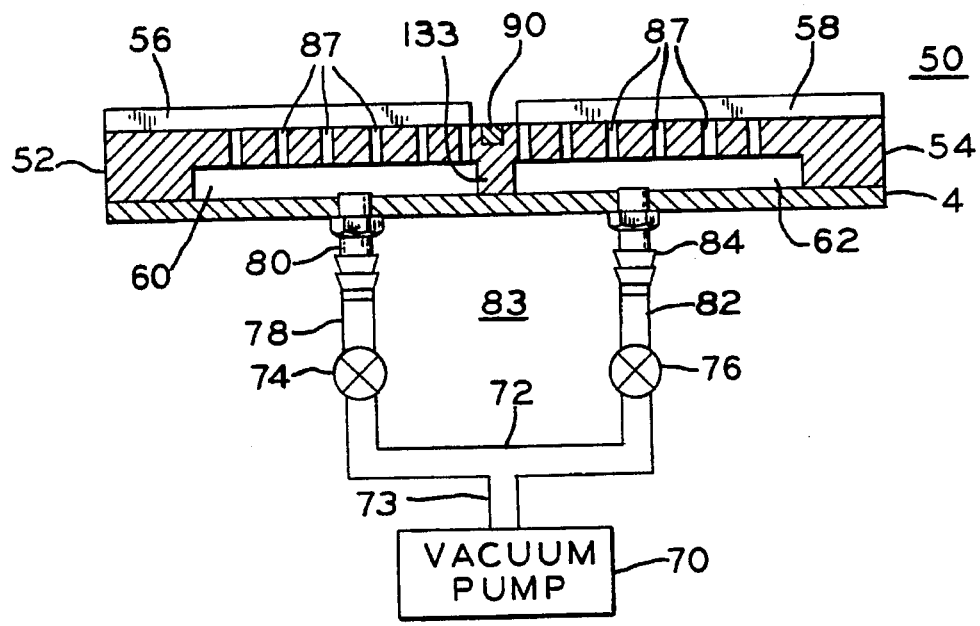
FIG. 4 is a cross-sectional view taken along lines 4—4 of FIG. 3 and in addition shows the connections from the vacuum pump.

Referring next to FIGS. 3 and 4 in addition to FIG. 8, foil handling and welding means 50 includes a first foil retainer portion 52 and a second foil retainer portion 54 with a plurality of apertures 87 through the surfaces connected to manifolds 60 and 62, respectively, which are in turn connected through nipples 80 and 84, respectively, to a vacuum system 83. Vacuum system 83 includes vacuum pump 70 connected through conduit 73 to Y-connection 72 to provide a vacuum through solenoid actuated valves 74 and 76, respectively, and tubing 78 and 82, respectively, to foil retainers 52 and 54, respectively. Foil retainers 52 and 54 include foil guides 56 and 58, respectively, against which the edge of foils 30 and 31 are placed to overlie apertures 87 in regions 85 and 81, respectively, which retain each foil in place as long as a vacuum is applied by the selective actuation of solenoid valve 74 and 76. Foil handling and welding means 50 includes foil and weld positioner 120 shown in detail in FIGS. 5, 6, and 7.

Referring to FIGS. 5, 6, and 7 in addition to FIG. 3, foil handling and welding means 50 includes foil overlap guide 120 which includes longitudinal member 110 and a pair of transverse members 112 and 114 at the ends. Locator pins 116 on transverse member 112 is positioned on one side of the axis 108 of longitudinal member 110 while a second locating pin 118 is positioned on the opposite side of the axis of the longitudinal member on transverse member 114 with locator pins 116 and 118 equidistant from the axis.

Positioning apertures 130 and 132 (see FIG. 3) on base 4 are dimensioned to removably receive pins 116 and 118 to enable accurate placement of foil overlap guide 120 onto base 4 with overlap rotatable control 125 positioned in the region 133 between foil retainers 52 and 54. Two pairs of legs 144, 146 enable the stable positioning of foil overlap guide 120 on the work bench while preventing possible damaging of foil stop 142 through contact with the work bench.

FIG. 7 is enlarged view of overlap control 125. Referring to FIG. 7 in particular, and also to FIGS. 5 and 6, overlap control 125 includes handle 122 with knurled surface 124 mounted on longitudinal member 110 by positioning studs 104 and 106 cooperating with apertures 126 and 128 in the longitudinal member. Shaft 123 extends from handle 122 through aperture 127 in the center of longitudinal member 110. Overlap foil stop 140 threaded to the end of shaft 123 includes a notched bottom portion providing foil stop 142 against which the sheared ends of the foils 30 and 31 are moved in order to position them properly on foil retainers 52 and 54. The distance between the center of rotation of shaft 123 and of axis 108 to foil stop 142 is selected to be half the total distance of the overlap of the foils to be joined. That is, the overlap of the foils to be joined is twice the offset of foil stop 142 from axis 108 as described in more detail below. In using the subject invention it may be desirable to have a plurality of overlap controls 125 to be able to selectively provide the amount of overlap desired for a particular type of foil or material. Foil overlap guide 120 is mounted on base 4 by mounting post 144 and 146 positioned within positioning apertures, and secured in place by transverse fasteners 152 and 154 respectively, to ensure that foil stop 142 is perpendicular to foil guides 56 and 58.

In positioning and welding the sheared ends of two foils, the foils are placed in an initial position on foil retainers 52 and 54 with the sheared end separated by, but proximate to, foil overlap guide 120.

That is, each foil such as foil 30 (partially shown by way of example in FIG. 3 on foil retainer 54) is placed overlying apertures 87 and the related solenoid actuated valves 74 and 76 are opened to provide a vacuum to retain the foil in the approximate positions on either side of foil stop 142 with the sheared edge of foil 30 perpendicular to foil guide 58. Solenoid activated valve 76 is then opened enabling the operator to slide foil 30 the short remaining distance into contact with foil stop 142 to provide half the desired overlap between foil stop 142 and axis 108 as shown generally by arrow 147 in FIG. 7. Solenoid activated valve 76 is then energized to the open position to retain foil 30 in the accurately determined overlap or weld position. It is possible to initially position foil 30 in contact with foil stop 142 before activating valve 76 to retain foil 30. Foil 31 may then be positioned with overlap as described below.

Overlap control 125 is then raised against spring 141 and foil stop 142 is rotated 180° through rotation of handle 122 to position the foil stop on the opposite side of axis 108 to receive the second foil 31. After solenoid valve 74 is closed to discontinue the vacuum retention of foil 31, foil 31 is slid the short distance over foil retainer 52 along and against foil guide 56 from its initial vacuum retained position to abut foil stop 142 in the manner described above for first foil 30. Thus, each foil is freed to move by closing its associated solenoid valve 74, 76 while the foil is slid the short distance along foil guides 56, 58 until the sheared ends contact foil stop 142. The total overlap is precisely twice the distance 147 determined by the offset of foil stop 142 and axis 108. After the second foil 31 is positioned against foil stop 142, solenoid valve 74 is actuated to retain the second foil 31 in final overlapping position for welding.

Foil overlap guide 120 is then removed from its position overlying insert or anvil 90. Ultrasonic horn shown generally as arrow 156 is guided to pass precisely over the foil 30, 31 overlap region which has been positioned over insert 90 secured in base 4 by suitable fasteners such as set screws 152 and 154. Insert 90 is a square cross section enabling selective positioning of one of the four surfaces to the path of ultrasonic horn 156. The size of ultrasonic horn 156 is selected to provide a weld with precisely compatible with the selected foil overlap width. Ultrasonic horn, 156 is guided in passage or slot 133 between foil retainers 52 and 54. The frequency of ultrasonic welder 89 is adjusted to provided a resonance and maximum and complete welding as is well known in the art.

A combination of weld passes such as a double pass on each side of the weld may be used.

By way of summary and with reference to FIG. 8, foil handling and welding means 50 is positioned on base 4 with associated ultrasonic welder 89 and edge shear 2 which provides a first sheared squared foil 41 and a second sheared squared foil 42 from edge shear 2 which is provided with foils 30 and 31, respectively from rotatable supply spools 28 and 29, respectively. First sheared foil 41 and second sheared foil 42 are positioned through use of foil handling and welding fixture 50 to place the first and second sheared foils in precise and desired overlapping positions to be subsequently welded by welding horn 90 of ultrasonic welder 89 which is precisely guided over the overlap formed between the first and second sheared foils. Superconducting foil 43 in consisting of the welded foils 41 and 42 plus a superconducting joint may then be fed to take up spool 45, or alternatively spooled back onto supply spool 28 or 29, to provide an increased length of superconducting foil for use in the process of manufacturing laminated superconducting tapes for superconducting magnets.

The present invention may thus be adjusted to provide various width welds suitable for use with various foils and has been found to provide a joint of minimized width and thickness which is superconducting in use and suitable for passing through the various stages of the superconducting magnet tape manufacturing process such as the 12 separate work stations or processes used in making $Nb_3Sn$ tape. Tapes formed utilizing welded foils of the present invention are suitable for use in winding superconducting magnet coils, such as coils used in MRIs.

While the present invention has been described with respect to certain preferred embodiments thereof, it is to be understood that numerous variations in the details of construction, the arrangement and combination of parts, and the type and configuration of materials used may be made without departing from the spirit and scope of the invention.

What we claim is:

1. Apparatus for forming joints for foils used in superconducting magnet tape comprising:

means to provide squared end lengths of foils to be joined;

foil handling and positioning means to overlap the square ends of said foils;

means to guide a welder across the overlap;

said foil handling and positioning means including at least two independently controlled foil retainers with edge guards for said foil;

at least one positionable stop to control the sequential positioning of one of said square ends over the other of said square ends;

each of said foil retainers being energizable for initial placement and retention of said square ends proximate to each other, deenergizable during overlap positioning of one of said square ends against said at least one positionable stop, and reenergized to retain the positioned foil against said stop; and means to offset said stop position a predetermined distance to control the amount of said overlap.

2. The superconducting joint forming apparatus of claim 1 wherein said foil retainer is a vacuum applied to the surface of the retained foil.

3. The superconducting joint forming apparatus of claim 2 wherein said vacuum is applied through a plurality of apertures on the surface of said foil retainers.

4. The superconducting joint forming apparatus of claim 3 wherein each of said foil retainers is provided with said vacuum through an independently controlled valve.

5. The superconducting joint forming apparatus of claim 4 wherein each said valve is solenoid activated and connects said vacuum to said apertures through a manifold.

6. The superconducting joint forming apparatus of claim 3 wherein said means to provide square end lengths of foil comprises a squared edge shearer including a foil edge guide and a blade in a blade support guided for movement perpendicular to said foil edge guide.

7. The superconducting joint forming apparatus of claim 6 wherein said blade support is guided within slots which extend perpendicular to the base supporting said foil edge guide.

8. The superconducting joint forming apparatus of claim 7 wherein after initial placement of a foil upon said base and against said edge guide, said blade support is moveable toward a surface on said base to clamp said foil between said blade and said surface to enable shearing of said foil to form a squared edge end perpendicular to the length of said foil.

9. The superconducting joint forming apparatus of claim 8 wherein said surface on said base is provided by an insert on said base which is square in cross section about the axis of the length thereof, and adjustable securing means enables said insert to be positioned on said securing device base such that all four surfaces of said length may be sequentially positioned under said blade to enable the provision of a replacement surface upon wear of any one of said surfaces.

10. The superconducting joint forming apparatus of claim 9 wherein said securing means include orthagonal bores at the ends of said insert and cooperating fasteners which pass through said bores to secure said insert to said base.

11. The superconducting joint forming apparatus of claim 10 wherein said insert is hardened steel.

12. The superconducting joint forming apparatus of claim 2 wherein said means to offset said stop includes at least one reversible foil edge stop which is reversible after the final positioning of one foil on said foil handling and positioning means, to provide a second stop position for the other foil the space of which from the first stop position being the amount of overlap for said superconducting joint.

13. The superconducting joint forming apparatus of claim 12 wherein said reversible foil edge stop is mounted on a foil stop guide which includes at least two weld positioning means which cooperate with positioning means on the base of said foil handling fixture to position said stop guide perpendicular to the edge guard of said foil handling fixture.

14. The superconducting joint forming apparatus of claim 13 wherein said foil edge stop is rotatably mounted on said foil stop guide a distance from a center line midway between said weld positioning means in a direction transverse to said edge guides which is one half the amount of overlap of said foils in their final position, and which upon rotation of said foil stop guide for positioning of the overlapping foil contributes an additional one half the amount of overlap to provide the preselected total overlap.

15. The superconducting joint forming apparatus of claim 3 wherein said welder is positioned adjacent said overlap, and means to guide said welder controls the welder to precisely pass over said overlap.

16. The superconducting joint forming apparatus of claim 15 wherein said welder is an ultrasonic welder with a welding horn selected to provide a weld with at least one pass over the overlap which is substantially the width of said overlap.

17. The superconducting joint forming apparatus of claim 16 wherein the frequency of said ultrasonic welder is adjustable to optimize the superconducting welded joint formed on said overlap of said superconducting foils.

18. Apparatus for forming joints for foils used in superconducting magnet tape and having controlled overlap comprising:

squared edge shearing means;

foil handling and positioning means; and a foil welder;

said square edge shearing means including a base over which said superconducting foils may be positioned, a foil edge guide, a blade in a blade support frame movable within slots extending perpendicular to said base and positioned orthogonally to said foil edge guide to enable said blade to be accurately moved down on said foil at right angles to the length of said foil; and a surface on said base below said blade such that said foil can be clamped between the cutting edge of said blade and said surface for precise shearing of said foil to provide a sheared end perpendicular to the length of said foil;

said foil handling and positioning means including a base, two foil retaining portions on said base each having means to selectively retain the sheared ends of a first and second foil to be joined in an initial spaced position, an edge guide for each foil, and means to discontinue the retaining means and sequentially position the sheared ends of the foils in welding position of overlap and to retain said foils in said welding overlapping position; and means to guide a welding head of said welder over said overlapping portion to form a superconducting joint between said first and second foils along said overlapping portion.

19. The superconducting foil joint apparatus of claim 18 wherein said retaining means includes a perforated surface in each foil retaining portion selectively and individually connected to a vacuum.

20. The superconducting foil joint apparatus of claim 19 wherein said means to position the sheared ends of said foils in an overlapping position includes a reversible abutting foil guide positioned on said base to provide a stop against which the ends of said foils are positioned, and said vacuum is selectively actuated to maintain each foil in a desired position and discontinued during movement of each foil.

* * * * *